(12) United States Patent
Stogdill et al.

(10) Patent No.: US 11,796,080 B2
(45) Date of Patent: Oct. 24, 2023

(54) VALVE ASSEMBLY

(71) Applicant: NIBCO Inc., Elkhart, IN (US)

(72) Inventors: James Stogdill, Elkhart, IN (US); David A. Bobo, Granger, IN (US); Matthew J. Krazit, Goshen, IN (US)

(73) Assignee: NIBCO INC., Elkhart, IN (US)

(*) Notice: Subject to any disclaimer, the term of this patent is extended or adjusted under 35 U.S.C. 154(b) by 0 days.

(21) Appl. No.: 17/690,501

(22) Filed: Mar. 9, 2022

(65) Prior Publication Data

US 2023/0287989 A1    Sep. 14, 2023

(51) Int. Cl.
| | |
|---|---|
| *F16K 35/02* | (2006.01) |
| *F16K 35/06* | (2006.01) |
| *F16K 5/06* | (2006.01) |
| *F16K 35/04* | (2006.01) |
| *F16K 31/60* | (2006.01) |

(52) U.S. Cl.
CPC ............ *F16K 35/025* (2013.01); *F16K 35/06* (2013.01); *F16K 5/06* (2013.01); *F16K 31/602* (2013.01); *F16K 35/04* (2013.01)

(58) Field of Classification Search
CPC .... F16K 5/06; F16K 31/602; F16K 35/00–16; F16K 37/0058
USPC .................................. 251/89, 90–93, 95–116
See application file for complete search history.

(56) References Cited

U.S. PATENT DOCUMENTS

| | | | | |
|---|---|---|---|---|
| 1,089,098 | A * | 3/1914 | Winkler | F16K 35/027 251/96 |
| 1,953,776 | A * | 4/1934 | Roberts | F16K 35/027 251/96 |
| 4,848,724 | A * | 7/1989 | Pettinaroli | F16K 5/0647 70/180 |
| 4,890,506 | A * | 1/1990 | Muller | G05G 1/04 251/102 |
| 5,014,528 | A | 5/1991 | Roberts | |
| 5,183,073 | A | 2/1993 | Roberts | |
| 5,365,759 | A | 11/1994 | Bonomi | |
| 5,482,251 | A * | 1/1996 | Roberts | F16K 35/06 251/293 |
| 6,260,819 | B1 * | 7/2001 | Ovsepyan | F16K 35/06 251/95 |
| 6,276,662 | B1 * | 8/2001 | Bugatti | F16K 35/00 251/95 |
| 8,944,404 | B2 * | 2/2015 | Giacomini | F16K 35/027 251/95 |
| 9,297,477 | B2 | 3/2016 | Yoder | |
| 9,797,522 | B1 * | 10/2017 | Del Real | F16K 35/025 |

(Continued)

FOREIGN PATENT DOCUMENTS

| | | |
|---|---|---|
| CN | 101709791 A | 5/2010 |
| CN | 105299258 B | 9/2018 |

(Continued)

*Primary Examiner* — Kenneth Rinehart
*Assistant Examiner* — Jonathan J Waddy
(74) *Attorney, Agent, or Firm* — PRICE HENEVELD LLP

(57) ABSTRACT

A ball valve assembly includes an outer sleeve having first and second pillars and defining an outer sleeve hollow, a first notch, a second notch, and a third notch, wherein the first pillar of the outer sleeve at least partially defines and is positioned between the first and second notches, and the second pillar of the outer sleeve at least partially defines and is positioned between the second and third notches.

7 Claims, 8 Drawing Sheets

(56) References Cited

U.S. PATENT DOCUMENTS

| | | | |
|---|---|---|---|
| 2015/0101684 A1* | 4/2015 | Yoder | F16K 35/06 |
| | | | 137/385 |
| 2020/0049275 A1 | 2/2020 | Chen | |
| 2020/0263807 A1 | 8/2020 | Whiteley et al. | |

FOREIGN PATENT DOCUMENTS

| CN | 208058106 U | 11/2018 |
|---|---|---|
| CN | 113175541 A | 7/2021 |
| CN | 113175542 A | 7/2021 |

* cited by examiner

VALVE ASSEMBLY

FIELD OF THE DISCLOSURE

The present invention relates to a valve assembly that includes an outer sleeve having first, second, and third notches.

BACKGROUND OF THE DISCLOSURE

Valve assemblies, such as ball valve assemblies, often include a handle that is operable to open and close a corresponding valve. A valve assembly that includes an outer sleeve and a locking device that is operable to engage the outer sleeve to maintain the handle of the valve assembly in the open and closed positions may be desired.

SUMMARY OF THE DISCLOSURE

According to a first aspect of the present disclosure, a ball valve assembly includes a ball valve body, a ball, a threaded stem, a travel stop, an inner sleeve, an outer sleeve, a handle, a barrel nut, and a locking device. The ball valve body defines a stem aperture and has at least one engagement feature. The ball defines a ball aperture positioned within the ball valve body. The threaded stem is coupled to the ball, extends upward through the stem aperture of the ball valve body, and is operable to pivot to move the ball between a valve-open position and a valve-closed position. The travel stop defines a travel stop aperture that receives a portion of the threaded stem therein to operably couple the travel stop to the threaded stem. The inner sleeve is coupled to the travel stop and defines an inner sleeve hollow that receives a portion of the threaded stem therein. The outer sleeve is engaged with the at least one engagement feature, has first and second pillars, defines an outer sleeve hollow, a first notch, a second notch, and a third notch, and is disposed about the inner sleeve, such that the inner sleeve is positioned within the outer sleeve hollow. The first pillar of the outer sleeve at least partially defines and is positioned between the first and second notches, and the second pillar of the outer sleeve at least partially defines and is positioned between the second and third notches. The handle has first and second ends, defines a receiver proximate the first end and is coupled to the inner sleeve proximate the first end. The handle is coupled to the inner sleeve, the inner sleeve is coupled to the travel stop, the travel stop is coupled to the threaded stem, and the threaded stem is coupled to the ball, such that the handle is operable to pivot relative to the ball valve body and the outer sleeve from a first position to a second position to move the ball from the valve-open position to the valve-closed position. The barrel nut extends through the receiver defined by the handle and into the inner sleeve hollow. The barrel nut is engaged with the threaded stem. The locking device has first and second engagement prongs and is movably coupled to the handle. In the first position of the handle, the locking device is operable to move relative to the handle between a disengaged position and a first engaged position. In the first engaged position, the first and second engagement prongs extend into the first and second notches, respectively, and straddle the first pillar, such that the locking device impedes movement of the handle from the first position to the second position. In the second position of the handle, the locking device is operable to move relative to the handle between the disengaged position and a second engaged position. In the second engaged position, the first and second engagement prongs extend into the second and third notches, respectively, and straddle the second pillar, such that the locking device impedes movement of the handle from the second position to the first position.

According to another aspect of the present disclosure, a ball valve assembly includes a ball valve body, a ball, an outer sleeve, a handle, and a locking device. The ball defines a ball aperture positioned within the ball valve body and is operable to pivot between a valve-open position and a valve-closed position. The outer sleeve is coupled to the ball valve body, has first and second pillars, and defines first, second, and third notches. The first pillar at least partially defines and is positioned between the first and second notches, and the second pillar at least partially defines and is positioned between the second and third notches. The handle is operably coupled to the ball and is operable to pivot relative to the ball valve body and the outer sleeve from a first position to a second position to move the ball from the valve-open position to the valve-closed position. The locking device has first and second engagement prongs and is movably coupled to the handle. In the first position of the handle, the locking device is operable to move relative to the handle between a disengaged position and a first engaged position. In the first engaged position, the first and second engagement prongs extend into the first and second notches, respectively, and straddle the first pillar, such that the locking device impedes movement of the handle from the first position to the second position. In the second position of the handle, the locking device is operable to move relative to the handle between the disengaged position and a second engaged position. In the second engaged position, the first and second engagement prongs extend into the second and third notches, respectively, and straddle the second pillar, such that the locking device impedes movement of the handle from the second position to the first position.

According to yet another aspect of the present disclosure, a valve assembly includes an outer sleeve. The outer sleeve has first and second pillars and defines an outer sleeve hollow, a first notch, a second notch, and a third notch. The first pillar of the outer sleeve at least partially defines and is positioned between the first and second notches, and the second pillar of the outer sleeve at least partially defines and is positioned between the second and third notches.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
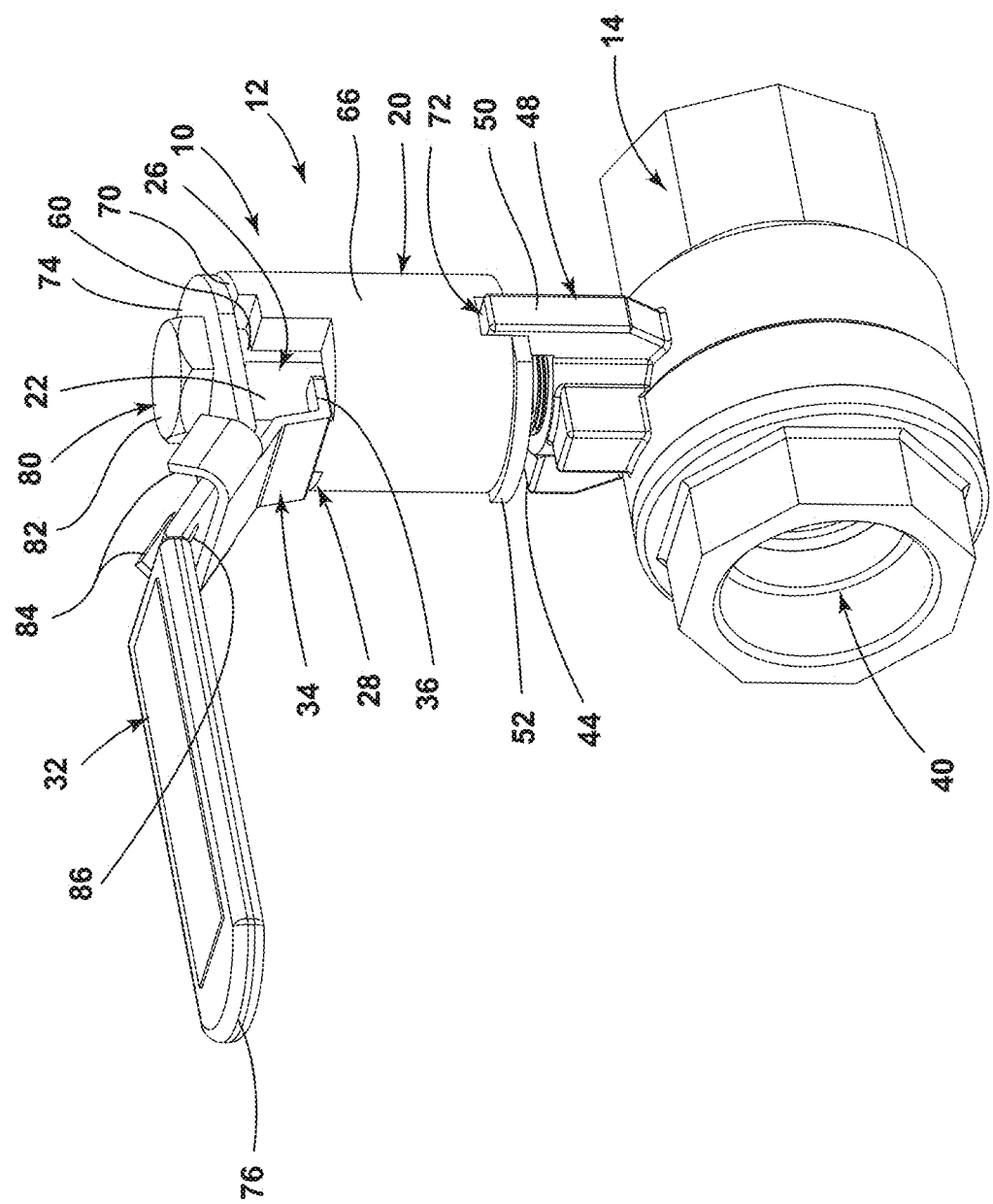
FIG. 1 is a top perspective view of a ball valve assembly that includes an outer sleeve, a handle, and a locking device movably coupled to the handle, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-8, a valve assembly 10 is disclosed. The valve assembly 10 can be a ball valve assembly 12. The ball valve assembly 12 can include a ball valve body 14. A ball 16 that defines a ball aperture 18 is positioned within the ball valve body 14 and is operable to pivot between a valve-open position and a valve-closed position. An outer sleeve 20 is coupled to the ball valve body 14. The outer sleeve 20 includes first and second pillars 22, 24. The outer sleeve 20 defines first, second, and third notches 26, 28, 30. The first pillar 22 at least partially defines and is positioned between the first and second notches 26, 28. The second pillar 24 at least partially defines and is positioned between the second and third notches 28, 30. The handle 32 is operably coupled to the ball 16 and is operable to pivot relative to the ball valve body 14 and the outer sleeve 20 from a first position to a second position to move the ball 16 from the valve-open position to the valve-closed position. A locking device 34 includes first and second engagement prongs 36, 38 and is movably coupled to the handle 32. In the first position of the handle 32, the locking device 34 is operable to move relative to the handle 32 between a disengaged position and a first engaged position. In the first engaged position, the first and second engagement prongs 36, 38 extend into the first and second notches 26, 28, respectively, and straddle the first pillar 22, such that the locking device 34 impedes movement of the handle 32 from the first position to the second position. In the second position of the handle 32, the locking device 34 is operable to move relative to the handle 32 between the disengaged position and a second engaged position. In the second engaged position, the first and second engagement prongs 36, 38 extend into the second and third notches 28, 30, respectively, and straddle the second pillar 24, such that the locking device 34 impedes movement of the handle 32 from the second position to the first position.

Figure 2:
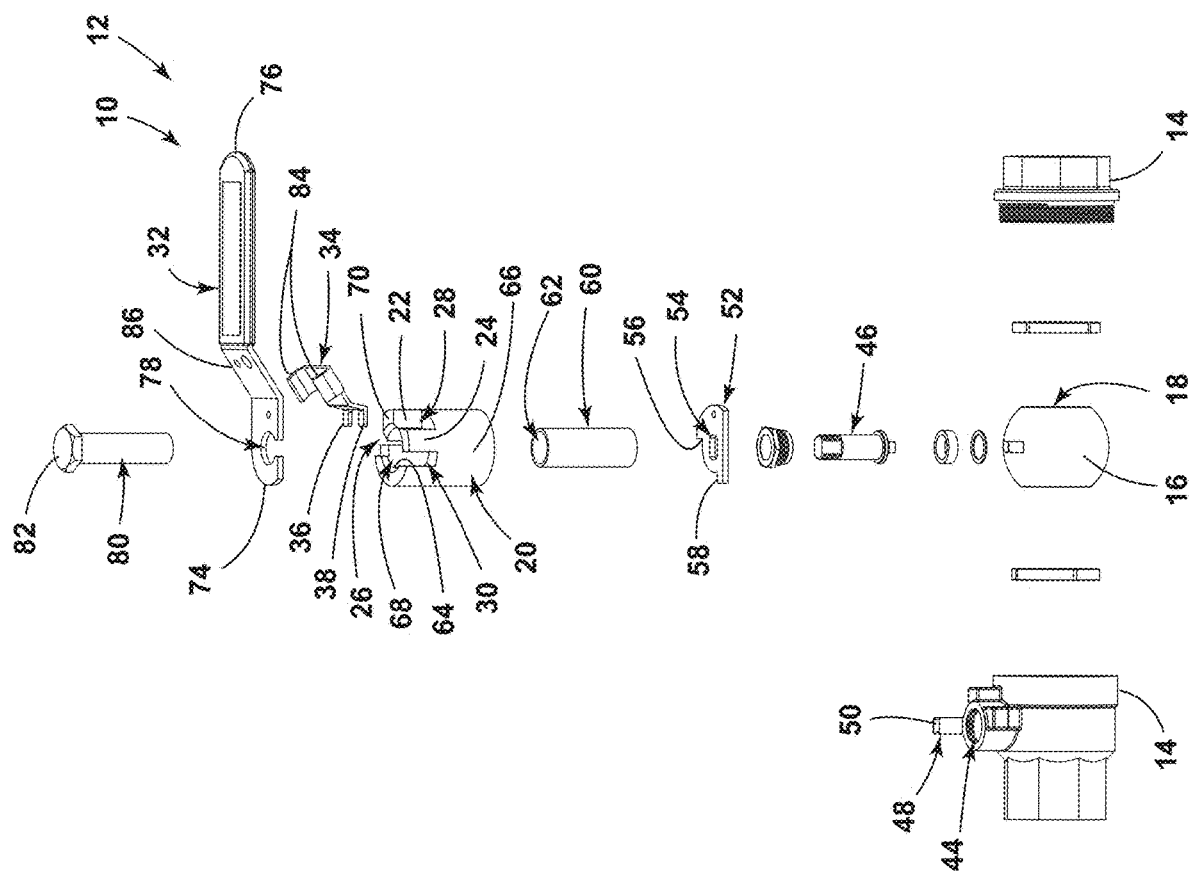
FIG. 2 is an exploded view of the ball valve assembly, according to one embodiment.
Figure 3:
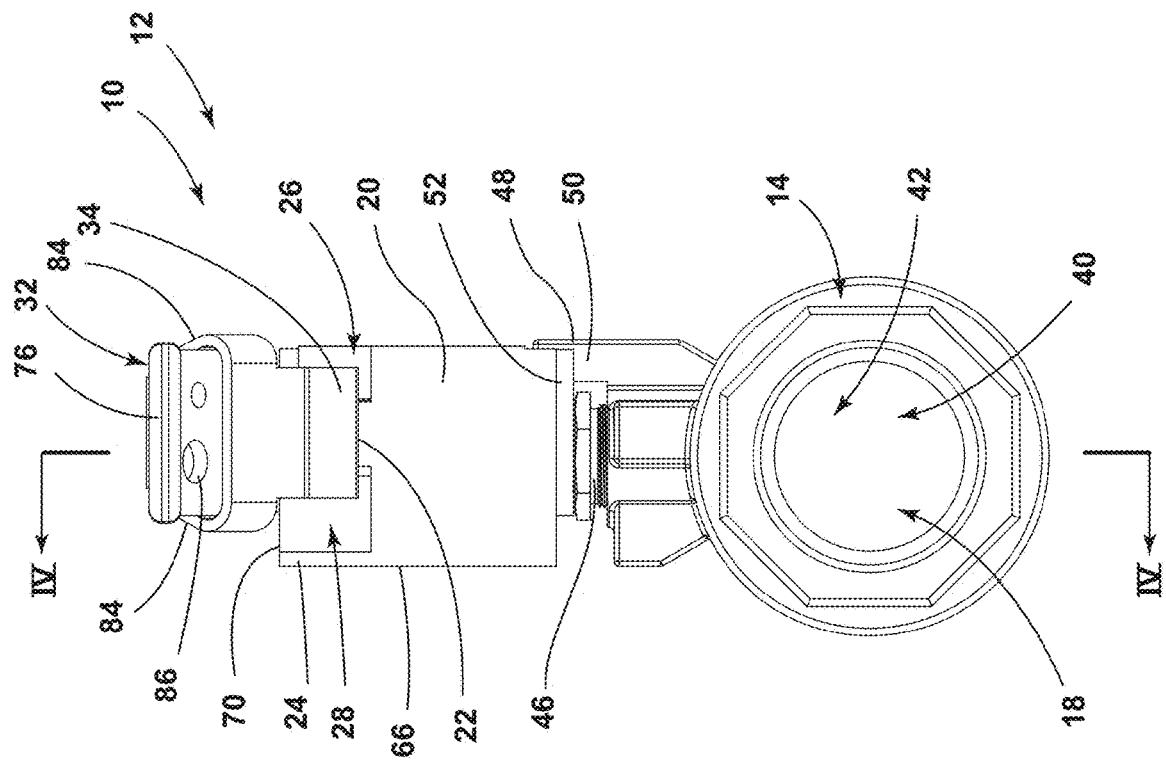
FIG. 3 is a side elevational view of the ball valve assembly, according to one embodiment.
Figure 4:
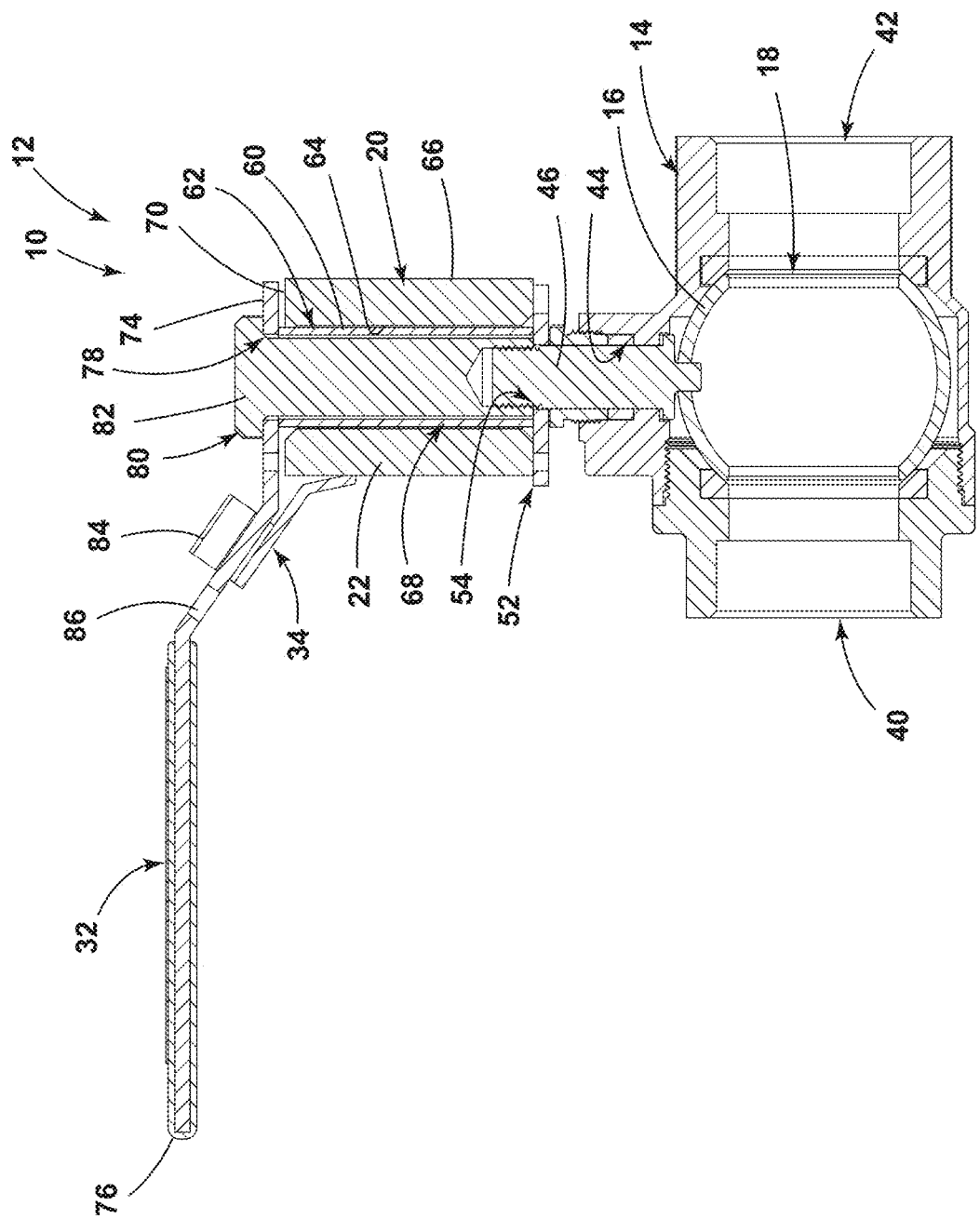
FIG. 4 is a cross-sectional view of the ball valve assembly taken through line IV-IV of FIG. 3 showing a ball of the ball valve assembly in a valve-open position, according to one embodiment.

Referring now to FIGS. 1-4, the ball valve assembly 12 includes the ball valve body 14. As illustrated in FIG. 4, the ball valve body 14 includes first and second openings 40, 42. The ball valve body 14 can define a stem aperture 44 that is configured to receive a threaded stem 46 of the ball valve assembly 12 therethrough, as described further herein. In various embodiments, the ball valve assembly 12 includes at least one engagement feature 48. In the embodiments illustrated in FIGS. 2 and 3, the at least one engagement feature 48 of the ball valve body 14 includes a protrusion 50 that extends outward from the ball valve body 14 proximate to the stem aperture 44.

Referring still to FIGS. 1-4, the ball valve assembly 12 includes the ball 16. The ball 16 is configured to be positioned within the ball valve body 14. As illustrated in FIG. 2, the ball 16 defines the ball aperture 18. The ball 16 is operable between the valve-open position, as illustrated in FIG. 3, and the valve-closed position. In various implementations, the ball 16 is configured to pivot between the valve-open position and the valve-closed position within the ball valve body 14. As illustrated in FIG. 3, in the valve-open position, the ball 16 is pivoted to a position within the ball valve assembly 12, wherein the ball aperture 18 is aligned with the first and second openings 40, 42 of the ball valve body 14, such that a fluid can flow into the first opening 40 of the ball valve body 14, through the ball aperture 18, and out of the second opening 42 of the ball valve body 14. In the valve-closed position, the ball 16 is pivoted to a position within the ball valve body 14, wherein the ball aperture 18 is not aligned with the first and second openings 40, 42 of the ball valve body 14, such that the ball 16 prevents fluid from flowing between the first and second openings 40, 42 of the ball valve body 14.

Referring still to FIGS. 1-4, the ball valve assembly 12 can include the threaded stem 46. The threaded stem 46 is configured to be coupled to the ball 16 of the ball valve assembly 12. For example, as illustrated in FIGS. 2 and 4, a portion of the threaded stem 46 is configured to be inserted into a slot defined by the ball 16 of the ball valve assembly 12 to couple the threaded stem 46 to the ball 16. As further illustrated in FIG. 4, the threaded stem 46 extends upward through the stem aperture 44 of the ball valve body 14. In various embodiments, the threaded stem 46 is operable to pivot to move the ball 16 between the valve-open position and the valve-closed position. As illustrated in FIGS. 2 and 4, the threaded stem 46 includes a threaded portion that is configured to be engaged with a corresponding threaded fastener, as described further herein.

Referring still to FIGS. 1-4, the ball valve assembly 12 can include a travel stop 52. As illustrated in FIG. 2, the travel stop 52 can define a travel stop aperture 54. As illustrated in FIG. 4, the threaded stem 46 can extend through the travel stop aperture 54 defined by the travel stop 52 to operably couple the travel stop 52 and the threaded stem 46. Interference between the travel stop 52 and the threaded stem 46 that extends through the travel stop aperture 54 may allow pivotal movement of the travel stop 52 to pivot the threaded stem 46, which may in turn pivot the ball 16 between the valve-open and valve-closed positions.

In various embodiments, the travel stop 52 can include first and second stop portions 56, 58, as illustrated in FIG. 2. The first stop portion 56 is configured to come into contact with the at least one engagement feature 48 of the ball valve body 14 to prevent over-pivoting of the ball 16, which is operably coupled to the travel stop 52 via the threaded stem 46 extending therebetween, beyond the valve-open position. The second stop portion 58 is configured to come into contact with the at least one engagement feature 48 of the ball valve body 14 to prevent over-pivoting of the ball 16 beyond the valve-closed position.

Referring still to FIGS. 1-4, the ball valve assembly 12 can include an inner sleeve 60. The inner sleeve 60 is coupled to the travel stop 52 and extends outward therefrom. In various embodiments, a first side of the travel stop 52 faces toward the ball valve body 14, and a second side of the travel stop 52 that is opposite the first side faces away from the ball valve body 14, wherein the inner sleeve 60 is coupled to the second side of the travel stop 52 and extends outward therefrom. As illustrated in FIGS. 2 and 4, the inner sleeve 60 defines an inner sleeve hollow 62. In the embodiment illustrated in FIG. 2, the inner sleeve 60 is generally tubular. The inner sleeve hollow 62 of the inner sleeve 60 can be configured to receive a portion of the threaded stem 46 therein. For example, as illustrated in FIG. 4, a threaded portion of the threaded stem 46 that is distal from the ball 16 coupled to the threaded stem 46 extends through the travel stop aperture 54 defined by the travel stop 52 and into the inner sleeve hollow 62 defined by the inner sleeve 60. As described further herein, in some embodiments, the inner sleeve 60 is fixedly coupled to the travel stop 52. For example, the inner sleeve 60 can be welded to the travel stop 52.

Referring still to FIGS. 1-4, the ball valve assembly 12 can include the outer sleeve 20. The outer sleeve 20 includes an interior side surface 64 and an exterior side surface 66 that is opposite the interior side surface 64. The interior side surface 64 defines an outer sleeve hollow 68, as illustrated in FIGS. 2 and 4. An upper surface 70 extends between the interior and exterior side surfaces 64, 66 of the outer sleeve 20.

In various embodiments, the outer sleeve 20 includes the first notch 26, the second notch 28, and the third notch 30. As illustrated in FIGS. 1-3, the first pillar 22 of the outer sleeve 20 at least partially defines and is positioned between the first and second notches 26, 28, and the second pillar 24 of the outer sleeve 20 at least partially defines and is positioned between the second and third notches 28, 30. In some embodiments, at least one of the first notch 26, the second notch 28, and the third notch 30 extends from the exterior side surface 66 of the outer sleeve 20 to the interior side surface 64 of the outer sleeve 20. For example, as illustrated in FIG. 2, the first, second, and third notches 26, 28, 30 extend from the exterior side surface 66 to the interior side surface 64 of the outer sleeve 20. In some embodiments, at least one of the first notch 26, the second notch 28, and the third notch 30 extends to the upper surface 70 of the outer sleeve 20. For example, in the embodiment illustrated in FIG. 2, the first, second, and third notches 26, 28, 30 extend to the upper surface 70 of the outer sleeve 20.

In some implementations, the exterior side surface 66 of the first pillar 22 has a curvature of a first radius, the exterior side surface 66 of the second pillar 24 has a curvature of a second radius, and the exterior side surface 66 of the remainder of the outer sleeve 20 has a curvature of a third radius. In some examples, the first, second, and/or third radii are substantially equal to each other. For example, in the embodiment illustrated in FIGS. 1-4, the exterior side surface 66 of the first pillar 22, the second pillar 24, and the remainder of the outer sleeve 20 share curvatures of substantially equal radii. It is contemplated that a portion of the remainder of the exterior side surface 66 of the outer sleeve 20 and/or the majority of the remainder of the exterior side surface 66 of the outer sleeve 20 may have a curvature with a radius that is substantially equal to the radius of the exterior side surface 66 of the first pillar 22 and/or the exterior side surface 66 of the second pillar 24, in some implementations.

Referring still to FIGS. 1-4, in various embodiments, the outer sleeve 20 is disposed about the inner sleeve 60, such that the inner sleeve 60 is positioned within the outer sleeve hollow 68. For example, as illustrated in FIG. 4, the inner sleeve 60 extends within the outer sleeve hollow 68. In various embodiments, the outer sleeve 20 is coupled to the ball valve body 14. In some implementations, the outer sleeve 20 can be engaged with the at least one engagement feature 48 of the ball valve body 14. In the embodiment illustrated in FIG. 1, the outer sleeve 20 defines a lower recess 72, and the at least one engagement feature 48 of the ball valve body 14 includes a protrusion 50 that extends outward from the ball valve body 14. As illustrated in FIG. 1, the protrusion 50 is received within the lower recess 72, such that the outer sleeve 20 is engaged with the at least one engagement feature 48. The engagement between the outer sleeve 20 and the at least one engagement feature 48 coupled to the ball valve body 14 can generally prevent pivotal movement of the outer sleeve 20 relative to the ball valve body 14. As described further herein, the outer sleeve 20 being engaged with the at least one engagement feature 48 in this way may allow the inner sleeve 60, travel stop 52, threaded stem 46, and ball 16 to pivot relative to the ball valve body 14 and the outer sleeve 20 in operation of the ball valve assembly 12.

Referring now to FIGS. 1-8, the ball valve assembly 12 includes the handle 32. The handle 32 includes a first end 74 and a second end 76. As illustrated in FIG. 4, the handle 32 can be coupled to the inner sleeve 60 proximate to the first end 74, and the second end 76 may be distal from the first end 74. As illustrated in FIG. 2, the handle 32 defines a receiver 78 that is proximate to the first end 74 of the handle 32.

Figure 5:
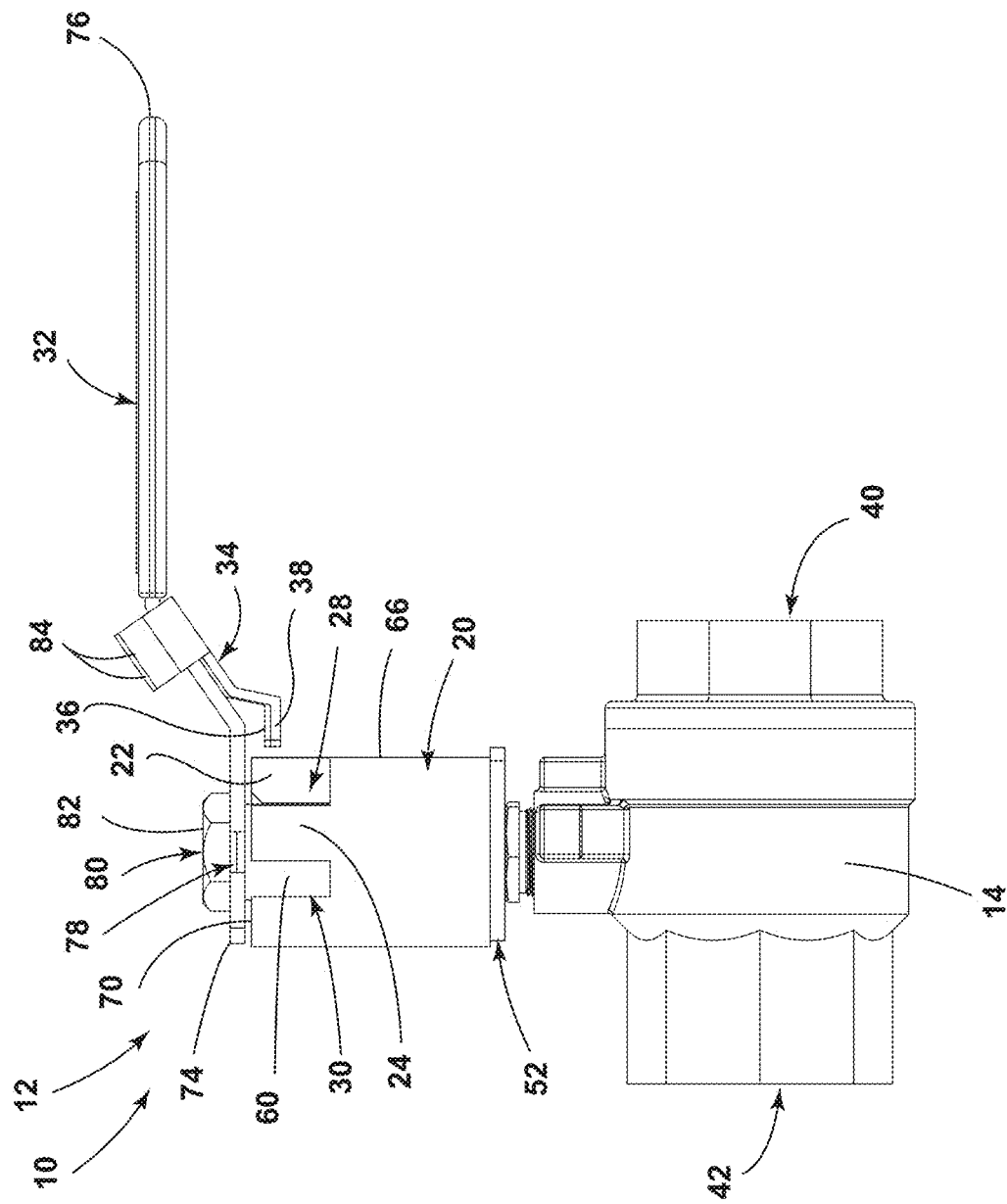
FIG. 5 is a top perspective view of the ball valve assembly, illustrating a handle of the ball valve assembly in a first position and a locking device of the ball valve assembly in a disengaged position, according to one embodiment.
Figure 6:
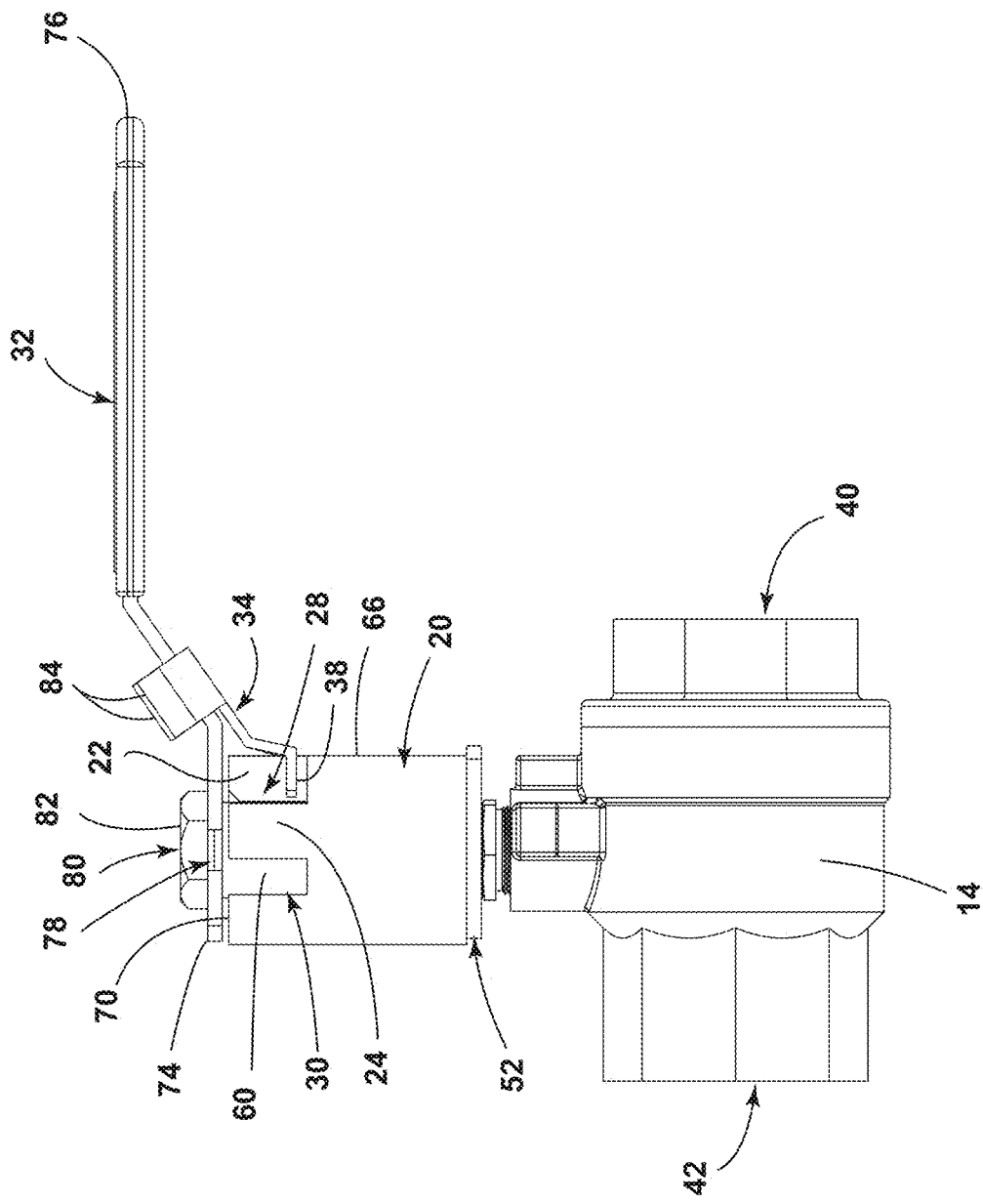
FIG. 6 is a top perspective view of the ball valve assembly, illustrating the handle in the first position and the locking device in a first engaged position, according to one embodiment.
Figure 7:
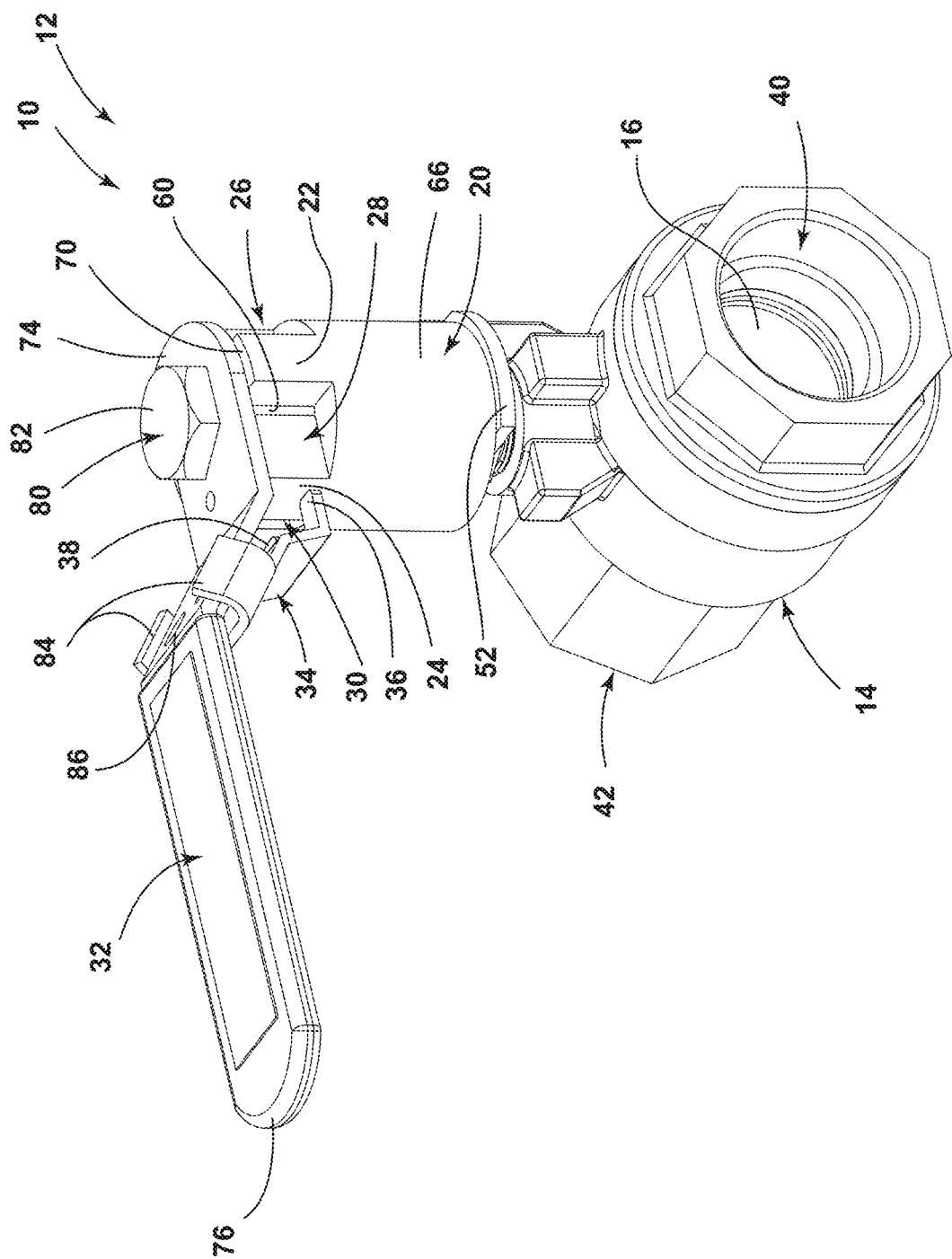
FIG. 7 is a top perspective view of the ball valve assembly, illustrating the handle in a second position and the locking device in a disengaged position, according to one embodiment.
Figure 8:
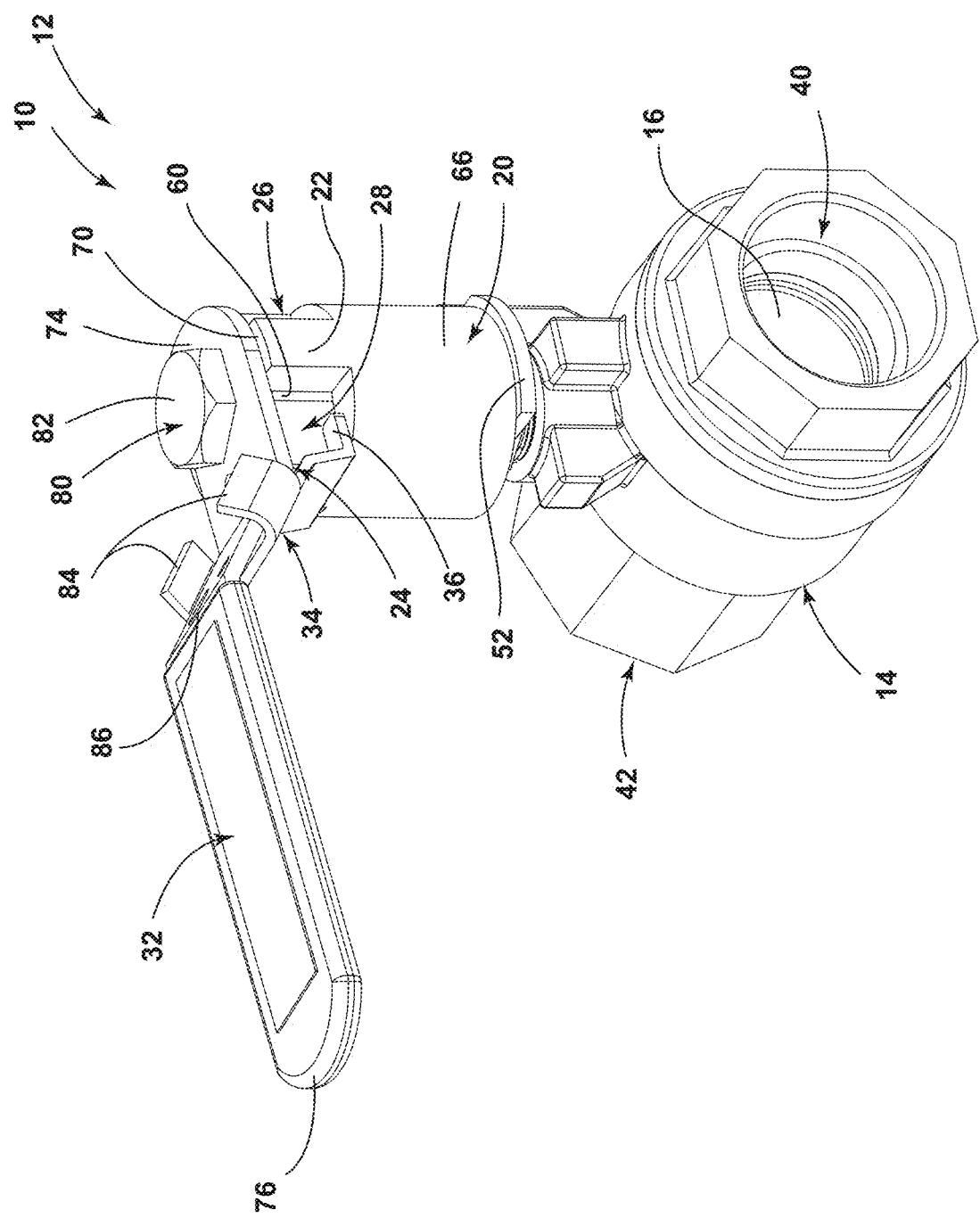
FIG. 8 is a top perspective view of the ball valve assembly, illustrating the handle in the second position and the locking device in a second engaged position, according to one embodiment.

Referring still to FIGS. 1-8, the handle 32 is operably coupled to the ball 16, such that the handle 32 is operable to pivot relative to the ball valve body 14 and the outer sleeve 20 from the first position, as illustrated in FIGS. 5 and 6, to the second position, as illustrated in FIGS. 7 and 8, to move the ball 16 from the valve-open position to the valve-closed position. For example, in the embodiment illustrated in FIGS. 5-8, the handle 32 is coupled to the inner sleeve 60, the inner sleeve 60 is coupled to the travel stop 52, the travel stop 52 is coupled to the threaded stem 46, and the threaded stem 46 is coupled to the ball 16, such that the handle 32 is operable to pivot relative to the ball valve body 14 and the outer sleeve 20 from the first position to the second position to move the ball 16 from the valve-open position to the valve-closed position. In some embodiments, the handle 32 is fixedly coupled to the inner sleeve 60. For example, the handle 32 can be welded to the inner sleeve 60. In various embodiments, the travel stop 52 and the handle 32 are coupled to opposite ends of the inner sleeve 60. In some embodiments, the handle 32 and the travel stop 52 are welded to opposite ends of the inner sleeve 60. In such embodiments, the inner sleeve 60 is positioned within the outer sleeve hollow 68 prior to at least one of the handle 32 and the travel stop 52 being welded to the inner sleeve 60. As illustrated in FIGS. 5-8, in various embodiments, the handle 32 may pivot about 90 degrees between first and second positions.

Referring now to FIGS. 1-4, the ball valve assembly 12 can include a barrel nut 80. As illustrated in FIG. 4, the barrel nut 80 can extend through the receiver 78 defined by the handle 32 and into the inner sleeve hollow 62 defined by the inner sleeve 60, wherein the barrel nut 80 is engaged with the threaded stem 46. This engagement with the threaded stem 46 and the engagement of a head 82 of the barrel nut 80 with the handle 32 is configured to maintain the ball valve assembly 12 in an assembled condition.

Referring now to FIGS. 2 and 5-8, the ball valve assembly 12 includes the locking device 34. The locking device 34 includes the first and second engagement prongs 36, 38. As illustrated in FIG. 2, the first and second engagement prongs 36, 38 are in a spaced-relationship with each other, such that a gap exists between the first and second engagement prongs 36, 38. In various embodiments, the locking device 34 is movably coupled to the handle 32 of the ball valve assembly 12. In some embodiments, the locking device 34 is slidably coupled to the handle 32 and is operable to slide along at least a portion of the length of the handle 32 between the first and second ends 74, 76 of the handle 32. In the embodiment illustrated in FIGS. 5-8, the locking device 34 includes two curved tabs 84 that couple the locking device 34 to the handle 32 and allow the locking device 34 to move along the handle 32. In the illustrated embodiment, the first and second engagement prongs 36, 38 are positioned distally from the curved tabs 84 and are positioned beneath the handle 32 (i.e., between the handle 32 and the ball valve body 14). It is contemplated that the locking device 34 may be coupled to and operable to move relative to the handle 32 in a variety of ways, in various embodiments.

Referring now to FIGS. 5 and 6, the handle 32 is illustrated in the first position, which corresponds with the valve-open position of the ball 16 of the ball valve assembly 12. In the first position of the handle 32, the locking device 34 is operable to move relative to the handle 32 between the disengaged position (FIG. 5) and the first engaged position (FIG. 6). In the first engaged position, the first and second engagement prongs 36, 38 extend into the first and second notches 26, 28 of the outer sleeve 20, respectively, and straddle the first pillar 22 of the outer sleeve 20. As such, the locking device 34 impedes movement of the handle 32 from the first position to the second position. In operation, the locking device 34 generally preventing the handle 32 from moving from the first position to the second position may advantageously ensure that the ball 16 is maintained in the valve-open position.

Referring now to FIGS. 7 and 8, in the illustrated embodiment, the handle 32 of the ball valve assembly 12 is in the second position. In the second position of the handle 32, the locking device 34 is operable to move relative to the handle 32 between the disengaged position (FIG. 7) and the second engaged position (FIG. 8). In the second engaged position, the first and second engagement prongs 36, 38 extend into the second and third notches 28, 30 of the outer sleeve 20, respectively, and straddle the second pillar 24, such that the locking device 34 impedes movement of the handle 32 from the second position to the first position. Generally preventing movement of the handle 32 from the second position to the first position may advantageously allow the ball 16 of the ball valve assembly 12 to be maintained in the valve-closed position.

Referring still to FIGS. 5-8, in the illustrated embodiment, the locking device 34 is slidably coupled to the handle 32 and is operable to slide along the handle 32 toward the first end 74 of the handle 32 as the locking device 34 slides away from the disengaged position. For example, as illustrated in FIGS. 5 and 6, the locking device 34 is operable to slide along the handle 32 toward the first end 74 of the handle 32 from the disengaged position, as illustrated in FIG. 5, to the first engaged position, as illustrated in FIG. 6. As illustrated in FIG. 8, the handle 32 defines a lock-receiving feature 86. The lock-receiving feature 86 is configured to receive a lock (e.g., padlock, etc.) that extends within the lock-receiving feature 86 to maintain the locking device 34 in at least one of the disengaged position, the first engaged position, and the second engaged position. In the embodiment illustrated in FIG. 8, the lock-receiving feature 86 is an aperture defined by the handle 32 between the receiver 78 and the second end 76 of the handle 32.

The height of the threaded stem 46, the barrel nut 80, the inner sleeve 60, and the outer sleeve 20 can be adjusted depending on the desired height of the handle 32. Additionally, the valve assembly 10 can be retrofitted to existing valves, in some embodiments.

According to a first aspect of the present disclosure, a ball valve assembly includes a ball valve body, a ball, a threaded stem, a travel stop, an inner sleeve, an outer sleeve, a handle, a barrel nut, and a locking device. The ball valve body defines a stem aperture and has at least one engagement feature. The ball defines a ball aperture positioned within the ball valve body. The threaded stem is coupled to the ball, extends upward through the stem aperture of the ball valve body, and is operable to pivot to move the ball between a valve-open position and a valve-closed position. The travel stop defines a travel stop aperture that receives a portion of the threaded stem therein to operably couple the travel stop to the threaded stem. The inner sleeve is coupled to the travel stop and defines an inner sleeve hollow that receives a portion of the threaded stem therein. The outer sleeve is engaged with the at least one engagement feature, has first and second pillars, defines an outer sleeve hollow, a first notch, a second notch, and a third notch, and is disposed about the inner sleeve, such that the inner sleeve is positioned within the outer sleeve hollow. The first pillar of the outer sleeve at least partially defines and is positioned between the first and second notches, and the second pillar of the outer sleeve at least partially defines and is positioned between the second and third notches. The handle has first and second ends, defines a receiver proximate the first end and is coupled to the inner sleeve proximate the first end. The handle is coupled to the inner sleeve, the inner sleeve is coupled to the travel stop, the travel stop is coupled to the threaded stem, and the threaded stem is coupled to the ball, such that the handle is operable to pivot relative to the ball valve body and the outer sleeve from a first position to a second position to move the ball from the valve-open position to the valve-closed position. The barrel nut extends through the receiver defined by the handle and into the inner sleeve hollow. The barrel nut is engaged with the threaded stem. The locking device has first and second engagement prongs and is movably coupled to the handle. In the first position of the handle, the locking device is operable to move relative to the handle between a disengaged position and a first engaged position. In the first engaged position, the first and second engagement prongs extend into the first and second notches, respectively, and straddle the first pillar, such that the locking device impedes movement of the handle from the first position to the second position. In the second position of the handle, the locking device is operable to move relative to the handle between the disengaged position and a second engaged position. In the second engaged position, the first and second engagement prongs extend into the second and third notches, respectively, and straddle the second pillar, such that the locking device impedes movement of the handle from the second position to the first position.

According to a second aspect, the first aspect is provided, wherein the travel stop is welded to the inner sleeve and the handle is welded to the inner sleeve.

According to a third aspect, the first aspect is provided, wherein the outer sleeve defines a lower recess, and the at least one engagement feature of the ball valve body includes a protrusion that extends outward from the ball valve body and is received within the lower recess, such that the outer sleeve is engaged with the at least one engagement feature.

According to a fourth aspect, the first aspect is provided, wherein the outer sleeve further includes an interior side surface that defines the outer sleeve hollow, and an exterior side surface opposite the interior side surface.

According to a fifth aspect, the fourth aspect is provided, wherein at least one of the first notch, the second notch, and the third notch extends from the exterior side surface to the interior side surface.

According to a sixth aspect, the fourth aspect is provided, wherein the outer sleeve further includes an upper surface between the interior and exterior side surfaces. At least one of the first notch, the second notch, and the third notch extends to the upper surface.

According to a seventh aspect, the first aspect is provided, wherein the locking device is slidably coupled to the handle and operable to slide along the handle toward the first end of the handle from the disengaged position to the first engaged position.

According to an eighth aspect of the present disclosure, a ball valve assembly includes a ball valve body, a ball, an outer sleeve, a handle, and a locking device. The ball defines a ball aperture positioned within the ball valve body and is operable to pivot between a valve-open position and a valve-closed position. The outer sleeve is coupled to the ball valve body, has first and second pillars, and defines first, second, and third notches. The first pillar at least partially defines and is positioned between the first and second notches, and the second pillar at least partially defines and is positioned between the second and third notches. The handle is operably coupled to the ball and is operable to pivot relative to the ball valve body and the outer sleeve from a first position to a second position to move the ball from the valve-open position to the valve-closed position. The locking device has first and second engagement prongs and is movably coupled to the handle. In the first position of the handle, the locking device is operable to move relative to the handle between a disengaged position and a first engaged position. In the first engaged position, the first and second engagement prongs extend into the first and second notches, respectively, and straddle the first pillar, such that the locking device impedes movement of the handle from the first position to the second position. In the second position of the handle, the locking device is operable to move relative to the handle between the disengaged position and a second engaged position. In the second engaged position, the first and second engagement prongs extend into the second and third notches, respectively, and straddle the second pillar, such that the locking device impedes movement of the handle from the second position to the first position.

According to a ninth aspect, the eighth aspect is provided, wherein the outer sleeve further includes an interior side surface that defines an outer sleeve hollow, and an exterior side surface opposite the interior side surface.

According to a tenth aspect, the ninth aspect is provided, wherein at least one of the first notch, the second notch, and the third notch extends from the exterior side surface to the interior side surface.

According to an eleventh aspect, the ninth aspect is provided, wherein the outer sleeve further includes an upper surface between the interior and exterior side surfaces. At least one of the first notch, the second notch, and the third notch extends to the upper surface.

According to a twelfth aspect of the present disclosure, a valve assembly includes an outer sleeve. The outer sleeve has first and second pillars and defines an outer sleeve hollow, a first notch, a second notch, and a third notch. The first pillar of the outer sleeve at least partially defines and is positioned between the first and second notches, and the second pillar of the outer sleeve at least partially defines and is positioned between the second and third notches.

According to a thirteenth aspect, the twelfth aspect is provided, wherein the outer sleeve further includes an interior side surface that defines the outer sleeve hollow, and an exterior side surface opposite the interior side surface.

According to a fourteenth aspect, the thirteenth aspect is provided, wherein at least one of the first notch, the second notch, and the third notch extends from the exterior side surface to the interior side surface.

According to a fifteenth aspect, the thirteenth aspect is provided, wherein the outer sleeve further includes an upper surface between the interior and exterior side surfaces. At least one of the first notch, the second notch, and the third notch extends to the upper surface.

According to a sixteenth aspect, the twelfth aspect is provided, wherein the valve assembly further includes a handle operable to pivot relative to the outer sleeve between a first position and a second position, and a locking device having first and second engagement prongs and being movably coupled to the handle. In the first position of the handle, the locking device is operable to move relative to the handle between a disengaged position and a first engaged position. In the first engaged position, the first and second engagement prongs extend into the first and second notches, respectively, and straddle the first pillar, such that the locking device impedes movement of the handle from the first position to the second position. In the second position of the handle, the locking device is operable to move relative to the handle between the disengaged position and a second engaged position. In the second engaged position, the first and second engagement prongs extend into the second and third notches, respectively, and straddle the second pillar, such that the locking device impedes movement of the handle from the second position to the first position.

According to a seventeenth aspect, the sixteenth aspect is provided, wherein the valve assembly further includes an inner sleeve coupled to the handle and extending through the outer sleeve hollow to a travel stop coupled to the inner sleeve distally from the handle.

According to an eighteenth aspect, the seventeenth aspect is provided, wherein the handle is welded to the inner sleeve and the travel stop is welded to the inner sleeve.

According to a nineteenth aspect, the sixteenth aspect is provided, wherein the locking device is slidably coupled to the handle and operable to slide along the handle between the disengaged position and the first engaged position.

According to a twentieth aspect, the sixteenth aspect is provided, wherein the valve assembly further includes a ball valve body, and a ball that defines a ball aperture positioned within the ball valve body and being operably coupled to the handle, such that movement of the handle from the first position to the second position pivots the ball from a valve-open position to a valve-closed position.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents.

What is claimed is:

1. A ball valve assembly, comprising:
    a ball valve body defining a stem aperture and having at least one engagement feature;
    a ball that defines a ball aperture positioned within the ball valve body;
    a threaded stem coupled to the ball, extending upward through the stem aperture of the ball valve body, and being operable to pivot to move the ball between a valve-open position and a valve-closed position;
    a travel stop defining a travel stop aperture that receives a portion of the threaded stem therein to operably couple the travel stop to the threaded stem;
    an inner sleeve coupled to the travel stop and defining an inner sleeve hollow that receives a portion of the threaded stem therein;
    an outer sleeve engaged with the at least one engagement feature, having first and second pillars, defining an outer sleeve hollow, a first notch, a second notch, and a third notch, and being disposed about the inner sleeve, such that the inner sleeve is positioned within the outer sleeve hollow, wherein the first pillar of the outer sleeve at least partially defines and is positioned between the first and second notches, and the second pillar of the outer sleeve at least partially defines and is positioned between the second and third notches;
    a handle having first and second ends, defining a receiver proximate the first end and being coupled to the inner sleeve proximate the first end, wherein the handle is coupled to the inner sleeve, the inner sleeve is coupled to the travel stop, the travel stop is coupled to the threaded stem, and the threaded stem is coupled to the ball, such that the handle is operable to pivot relative to the ball valve body and the outer sleeve from a first position to a second position to move the ball from the valve-open position to the valve-closed position;
    a barrel nut that extends through the receiver defined by the handle and into the inner sleeve hollow, wherein the barrel nut is engaged with the threaded stem;
    a locking device having first and second engagement prongs and being movably coupled to the handle, wherein, in the first position of the handle, the locking device is operable to move relative to the handle between a disengaged position and a first engaged position, wherein the first and second engagement prongs extend into the first and second notches, respectively, and straddle the first pillar, such that the locking device impedes movement of the handle from the first position to the second position, and wherein, in the second position of the handle, the locking device is operable to move relative to the handle between the disengaged position and a second engaged position, wherein the first and second engagement prongs extend into the second and third notches, respectively, and straddle the second pillar, such that the locking device impedes movement of the handle from the second position to the first position, wherein the locking device is slidably coupled to the handle and operable to slide along the handle toward the first end of the handle from the disengaged position to the first engaged position.

2. The ball valve assembly of claim 1, wherein the travel stop is welded to the inner sleeve and the handle is welded to the inner sleeve.

3. The ball valve assembly of claim 1, wherein the outer sleeve defines a lower recess, and wherein the at least one engagement feature of the ball valve body includes a protrusion that extends outward from the ball valve body and is received within the lower recess, such that the outer sleeve is engaged with the at least one engagement feature.

4. The ball valve assembly of claim 1, wherein the outer sleeve further comprises:
    an interior side surface that defines the outer sleeve hollow; and
    an exterior side surface opposite the interior side surface.

5. The ball valve assembly of claim 4, wherein at least one of the first notch, the second notch, and the third notch extends from the exterior side surface to the interior side surface.

6. The ball valve assembly of claim 4, wherein the outer sleeve further comprises:
    an upper surface between the interior and exterior side surfaces, wherein at least one of the first notch, the second notch, and the third notch extends to the upper surface.

7. A ball valve assembly, comprising:
    a ball valve body defining a stem aperture and having at least one engagement feature;

a ball that defines a ball aperture positioned within the ball valve body;

a threaded stem coupled to the ball, extending upward through the stem aperture of the ball valve body, and being operable to pivot to move the ball between a valve-open position and a valve-closed position;

a travel stop defining a travel stop aperture that receives a portion of the threaded stem therein to operably couple the travel stop to the threaded stem;

an inner sleeve coupled to the travel stop and defining an inner sleeve hollow that receives a portion of the threaded stem therein;

an outer sleeve engaged with the at least one engagement feature, having first and second pillars, defining an outer sleeve hollow, a first notch, a second notch, and a third notch, and being disposed about the inner sleeve, such that the inner sleeve is positioned within the outer sleeve hollow, wherein the first pillar of the outer sleeve at least partially defines and is positioned between the first and second notches, and the second pillar of the outer sleeve at least partially defines and is positioned between the second and third notches;

a handle having first and second ends, defining a receiver proximate the first end and being coupled to the inner sleeve proximate the first end, wherein the handle is coupled to the inner sleeve, the inner sleeve is coupled to the travel stop, the travel stop is coupled to the threaded stem, and the threaded stem is coupled to the ball, such that the handle is operable to pivot relative to the ball valve body and the outer sleeve from a first position to a second position to move the ball from the valve-open position to the valve-closed position;

a barrel nut that extends through the receiver defined by the handle and into the inner sleeve hollow, wherein the barrel nut is engaged with the threaded stem; and a locking device having first and second engagement prongs and being movably coupled to the handle, wherein, in the first position of the handle, the locking device is operable to move relative to the handle between a disengaged position and a first engaged position, wherein the first and second engagement prongs extend into the first and second notches, respectively, and straddle the first pillar, such that the locking device impedes movement of the handle from the first position to the second position, and wherein, in the second position of the handle, the locking device is operable to move relative to the handle between the disengaged position and a second engaged position, wherein the first and second engagement prongs extend into the second and third notches, respectively, and straddle the second pillar, such that the locking device impedes movement of the handle from the second position to the first position; and wherein the outer sleeve defines a lower recess, and wherein the at least one engagement feature of the ball valve body includes a protrusion that extends outward from the ball valve body and is received within the lower recess, such that the outer sleeve is engaged with the at least one engagement feature.

\* \* \* \* \*